United States Patent
Juhlin-Dannfelt et al.

(10) Patent No.: US 9,283,961 B2
(45) Date of Patent: Mar. 15, 2016

(54) METHOD AND SYSTEM FOR CONTROL OF A CLUTCH

(75) Inventors: Peter Juhlin-Dannfelt, Hägersten (SE); Mikael Öun, Norsborg (SE)

(73) Assignee: SCANIA CV AB (SE)

(*) Notice: Subject to any disclaimer, the term of this patent is extended or adjusted under 35 U.S.C. 154(b) by 427 days.

(21) Appl. No.: 13/391,665

(22) PCT Filed: Sep. 13, 2010

(86) PCT No.: PCT/SE2010/050966
§ 371 (c)(1),
(2), (4) Date: Feb. 22, 2012

(87) PCT Pub. No.: WO2011/031224
PCT Pub. Date: Mar. 17, 2011

(65) Prior Publication Data
US 2012/0150402 A1 Jun. 14, 2012

(30) Foreign Application Priority Data

Sep. 14, 2009 (SE) ...................................... 0950661

(51) Int. Cl.
*B60W 30/184* (2012.01)
*B60W 30/18* (2012.01)
(Continued)

(52) U.S. Cl.
CPC ... *B60W 30/18027* (2013.01); *B60W 30/18045* (2013.01); *F16D 48/06* (2013.01);
(Continued)

(58) Field of Classification Search
CPC ................. B60W 30/18027; B60W 30/18045; B60W 10/02; B60W 2540/10; F16D 48/06; F16D 2500/70424; F16D 2500/3144; F16D 2500/508; F16D 2500/1112; F16D 2500/50224
USPC ......................... 180/197; 477/71, 74; 701/67
See application file for complete search history.

(56) References Cited

U.S. PATENT DOCUMENTS 4,768,636 A * 9/1988 Ito ........................ B60K 41/282
192/222
4,914,983 A * 4/1990 Simonyi .......... B60W 30/18045
192/92
(Continued)

FOREIGN PATENT DOCUMENTS

EP 1 342 607 A2 9/2003
EP 1662183 A2 * 5/2006
(Continued)

OTHER PUBLICATIONS

International Search Report mailed Jul. 22, 2010 in corresponding PCT International Application No. PCT/SE2010/050966.
(Continued)

*Primary Examiner* — Stephen Holwerda
(74) *Attorney, Agent, or Firm* — Ostrolenk Faber LLP

(57) ABSTRACT

A method for control of an automatically controlled clutch when setting a vehicle in motion on a running surface: the vehicle includes a combustion engine for generating driving force transmitted to at least one powered wheel, and a throttle control for demanding driving force from the engine. The magnitude of the driving force demanded from the engine is controlled by a driver of the vehicle by means of the throttle control. The method includes a step, when a first criterion representing the grip of the powered wheels on the running surface is fulfilled, of opening the automatically controlled clutch if the driver uses the throttle control to reduce the demand for driving force from the engine.

15 Claims, 4 Drawing Sheets

(51) Int. Cl.
*F16D 48/06* (2006.01)
*B60W 10/02* (2006.01)

(52) U.S. Cl.
CPC ........... *B60W 10/02* (2013.01); *B60W 2540/10* (2013.01); *F16D 2500/1112* (2013.01); *F16D 2500/508* (2013.01); *F16D 2500/50224* (2013.01); *F16D 2500/70424* (2013.01)

(56) References Cited

U.S. PATENT DOCUMENTS

| | | | | | |
|---|---|---|---|---|---|
| 4,953,654 | A | * | 9/1990 | Imaseki | B60K 23/04 180/197 |
| 5,076,385 | A | * | 12/1991 | Terazawa | F02D 9/1065 123/399 |
| 5,303,794 | A | * | 4/1994 | Hrovat | B60K 28/165 180/197 |
| 5,362,287 | A | * | 11/1994 | Tanaka | B60K 28/165 477/175 |
| 5,732,380 | A | * | 3/1998 | Iwata | B60K 28/16 123/336 |
| 5,833,572 | A | * | 11/1998 | Leising | B60W 10/06 477/102 |
| 2003/0183031 | A1 | * | 10/2003 | Shimaguchi | B60K 28/165 74/336 R |
| 2004/0014562 | A1 | * | 1/2004 | Kresse | B60W 10/115 477/107 |
| 2005/0235765 | A1 | * | 10/2005 | Herbster | B60W 30/18045 74/336 R |
| 2006/0237249 | A1 | * | 10/2006 | Steen | B60K 28/16 180/198 |
| 2007/0051196 | A1 | * | 3/2007 | Baldwin | B60W 10/113 74/335 |
| 2008/0045379 | A1 | | 2/2008 | Hardtle | 477/74 |

FOREIGN PATENT DOCUMENTS

| | | | |
|---|---|---|---|
| JP | 11173348 A | * | 6/1999 |
| WO | WO 2004/098940 | | 11/2004 |

OTHER PUBLICATIONS

English translation of Russian Office Action dated Jun. 7, 2013 issued in corresponding Russian Patent Application No. 2012114844/11.

\* cited by examiner

METHOD AND SYSTEM FOR CONTROL OF A CLUTCH

CROSS-REFERENCE TO RELATED APPLICATIONS

The present application is a 35 U.S.C. §§371 national phase conversion of PCT/SE2010/050966, filed Sep. 13, 2010, which claims priority of Swedish Application No. 0950661-9, filed Sep. 14, 2009, the contents of which are incorporated by reference herein. The PCT International Application was published in the English language.

FIELD OF THE INVENTION

The present invention relates to systems for setting a vehicle in motion, and particularly systems for doing so in unfavorable running surface conditions. In particular, the present invention relates to a method and to a system and a vehicle related to the system.

BACKGROUND TO THE INVENTION

It is well known that vehicles in general, and heavy vehicles in particular, may become stuck when trying to move from stationary in a situation of unfavorable running surface conditions. Such unfavorable running surface conditions may take the form of, for example, snow or other soft running surfaces such as sand, earth etc.

When a vehicle has to move off in such conditions it is usually in a situation where one or more powered wheels have become stuck in a cavity or a hollow. In that case, the engine torque (driving force) applied to set the vehicle in motion again may cause the powered wheels to slip before they have moved up out of the cavity/hollow. This may result in the cavity/hollow becoming still deeper and hence still more difficult to drive out.

When such situations arise, one or more "proven" methods for trying to free the vehicle are often used. For example, the vehicle's air suspension system may be used and/or tag axles be raised to increase the load on the powered wheels and thereby make it easier for them to gain a grip on the running surface. Another common method often used in the case of just such cavities/hollows is a rocking procedure, wherein the driver tries to rock the vehicle free by increasing the force applied to the powered wheels, preferably with a relatively high gear engaged, until the wheels spin free, whereupon the driver releases the accelerator pedal and disengages the clutch so that the vehicle rolls back. This procedure is then repeated when the ongoing movement in the opposite direction has ceased. Continuing to rock the vehicle in this way may ultimately achieve sufficient force to take the vehicle up out of the cavity/hollow.

As heavy vehicles have a high available torque even when idling, the rocking function can often be carried out by using only the clutch, whereby driving force is applied to the powered wheels by the driver releasing the clutch pedal and then depressing it quickly when the powered wheels begin to spin, so that the vehicle can roll back down into, and up on the opposite side of, the cavity/hollow. Once the movement in the opposite direction has ceased, the clutch can again be used to apply driving force to the powered wheels when the vehicle again begins to move in the initial direction, in order thereby to try to reach a higher speed than in the previous attempt to drive up out of the cavity/hollow. The procedure (the rocking) is then repeated until the vehicle has freed itself from the cavity/hollow or a need for further assistance is established.

It has become increasingly common for heavy vehicles to be fitted with automatically operated gearboxes. These gearboxes do not however usually take the form of automatic gearboxes in the traditional sense, but rather of "manual" gearboxes in which gear changing is controlled by a control system, in part because manual gearboxes are substantially cheaper to produce, but also because they are more efficient.

In one type the driver uses a clutch pedal to set the vehicle in motion from stationary, but all other gear changing can be effected by the vehicle's control system without involving the clutch at all. Instead the gear changes are carried out "torque-free", i.e. the torque delivered from the engine is adjusted to a suitable level to reduce the torque transmitted at the engagement points of the relevant gears. With power trains of this type, the driver therefore has access to a clutch pedal which he/she can also use to carry out the rocking function as above.

It is however also common for vehicles with a gearbox of the above type to be equipped with a fully automatically controlled clutch, whereby the driver has access to only an accelerator pedal and a brake pedal. When moving off as normal in a vehicle equipped with an automatically controlled clutch, the vehicle's control system will fully close the clutch when the driver presses the accelerator pedal. Thereafter the clutch will not open until the driver presses the brake and the engine speed drops to idling speed. This has the disadvantage that, in a rocking procedure, the engine's moment of inertia, until the clutch opens, will brake the vehicle's backward roll, thus reducing the effect of the rocking function and, in the worst case, preventing the vehicle from successfully moving off.

There is therefore, at least in certain situations, a need for an improved method for setting in motion vehicles with automatically controlled clutches in cases where the vehicle has become stuck.

SUMMARY OF THE INVENTION

An object of the present invention is to propose a method for control of a vehicle when moving off which solves the above problem.

The present invention relates to a method for control of an automatically controlled clutch when setting a vehicle in motion on a running surface. The vehicle has a combustion engine for generating driving force intended for transmission to at least one powered wheel, and a throttle control for demanding driving force from the engine. The magnitude of the driving force demanded from the engine is controlled by a driver of the vehicle by means of said throttle control. The method comprises the step, when a first criterion for a representation of the grip of the powered wheels on the running surface is fulfilled, of opening the automatically controlled clutch if the driver uses the throttle control to reduce the demand for driving force from the engine.

This has the advantage that the engine can be disconnected from the rest of the power train as soon as the driver reduces the demand for driving force, with the consequent advantage that when for example the driver tries to set the vehicle in motion from a cavity/hollow and the powered wheels lose their grip, the engine's moment of inertia, once the engine has been disconnected from the rest of the power train by opening of the clutch, will not affect the change in direction of rotation of the powered wheels which occurs when the vehicle begins to roll back down into the cavity/hollow, so maximum benefit may also be derived from the backward roll.

Further characteristics of the present invention and advantages thereof are indicated by the detailed description of examples of embodiments set out below and the attached drawings.

DETAILED DESCRIPTION OF EXAMPLES OF EMBODIMENTS

As mentioned above, it is difficult for a driver of a vehicle with an automatic clutch to achieve a rocking function precisely as desired, since he/she cannot directly influence the process by means of a clutch pedal.

The present invention solves this by using a method in which, unlike the state of the art, the driver can influence the opening/closing of the clutch in a desired way despite the lack of a clutch pedal.

Figure 1:
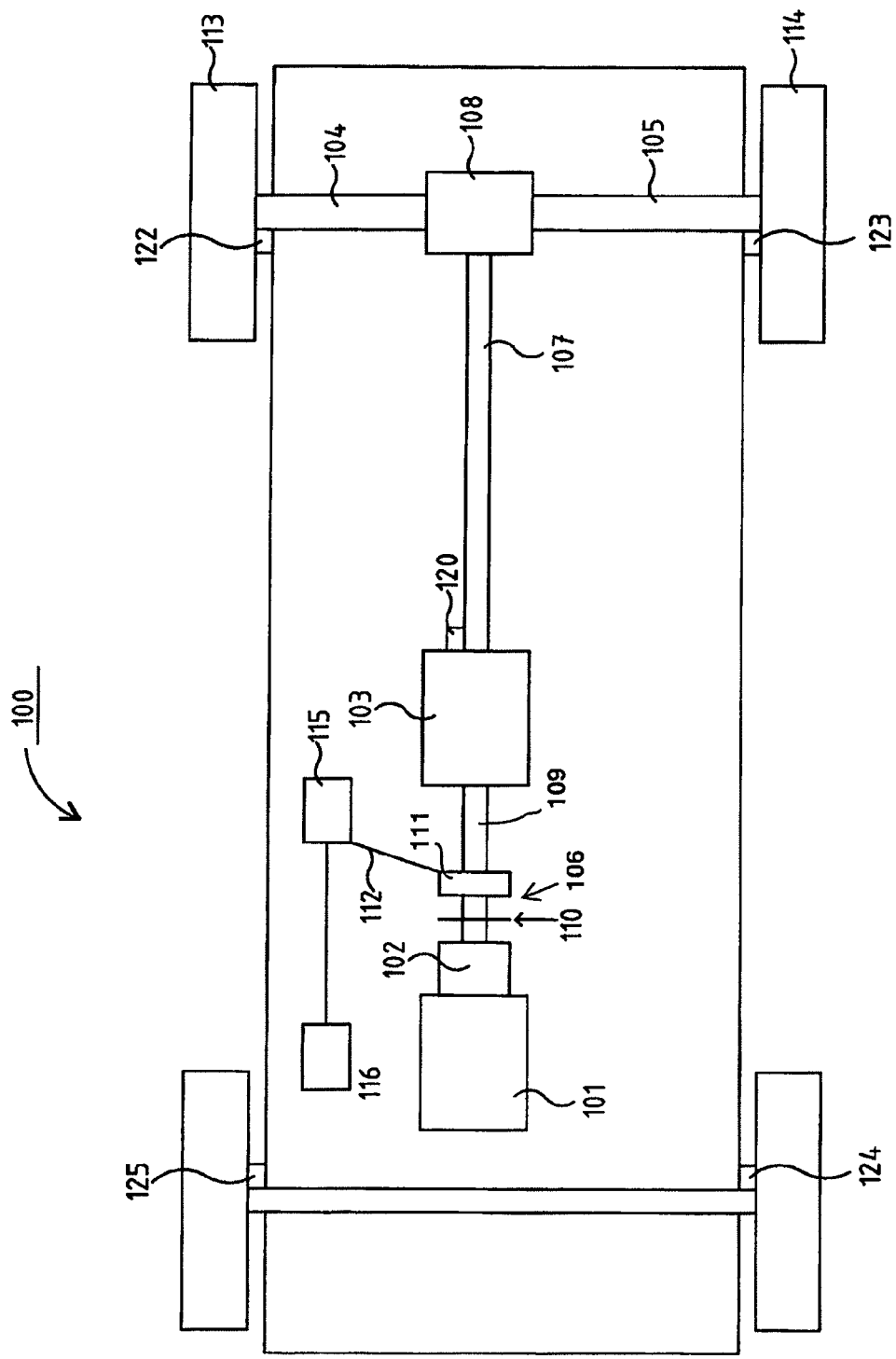
FIG. 1 depicts a power train in a vehicle with which the present invention may with advantage be used.

FIG. 1 illustrates an example of a power train in a vehicle 100 according to a first embodiment example of the present invention. The vehicle 100 schematically illustrated in FIG. 1 has only one axle with powered wheels 113, 114 but the invention is also applicable in vehicles in which more than one axle is equipped with powered wheels. The power train comprises a combustion engine 101 connected in a conventional way to a gearbox 103 via a clutch 106.

The vehicle further comprises drive shafts 104, 105 which are connected to the vehicle's powered wheels 113, 114 and are driven by an output shaft 107 from the gearbox 103 via an axle gear 108, e.g. a conventional differential.

The clutch 106 is of disc type whereby a friction element (disc) 110 connected to a first gearbox component, e.g. the input shaft 109 of the gearbox 103, engages selectively with the engine's flywheel 102 to transmit driving force from the combustion engine 101 to the powered wheels 113, 114 via the gearbox 103. The engagement of the clutch disc 110 with the engine's output shaft is controlled by means of a pressure plate 111, which is movable sideways, e.g. by means of a lever 112, the function of which is controlled by a clutch actuator 115. The influence of the clutch actuator 115 upon the lever 112 is controlled by the vehicle's control system.

Vehicle control systems in modern vehicles usually consist of a communication bus system consisting of one or more communication buses for connecting together a number of electronic control units (ECUs), or controllers, and various components located on the vehicle. A control system of this kind may comprise a large number of control units, and the responsibility for a specific function may be divided amongst two or more control units. For the sake of simplicity, FIG. 1 illustrates only one such control unit 116 which controls the clutch (the clutch actuator 115). In reality, the control of the clutch actuator 115 by the control unit 116 will for example probably depend on information which is for example received from one or more further control units.

The method according to the present invention may with advantage be implemented as a computer program which contains program code and which, when said program code is executed in a control unit, causes said control unit to carry out the method according to the invention. The computer program may be stored in a computer-readable medium, e.g. any from among the category which comprises ROM (read-only memory), PROM (programmable ROM), EPROM (erasable PROM), flash memory, EEPROM (electrically erasable PROM EPROM) and hard disc unit.

In the case of a vehicle with manual gear changing, or certain types of automatically operated "manual" gearboxes as above, the clutch actuator is controlled, directly or indirectly, by the driver by means of a clutch pedal (not illustrated) instead of being automatically controlled by the control system as above. These or similar types of gearboxes are often used in heavy vehicles where the clutch need only be used when setting the vehicle in motion, as subsequent gear changing while the vehicle is in motion will take place automatically, without the clutch opening, by adjusting the torque and speed of the engine output shaft to the torque and speed of the gearbox input shaft. With this type of vehicle, the driver can therefore likewise still use the clutch to achieve the desired rocking function when necessary.

In contrast, manual rocking is no easy matter with a vehicle of the type illustrated in FIG. 1 in which the clutch is controlled entirely automatically and consequently no clutch pedal is available to the driver. Even if it can be passably achieved, e.g. by releasing the accelerator pedal and putting the gear shift into neutral to allow the vehicle to roll in the opposite direction, followed by re-engaging a gear and pressing the accelerator pedal, it will in this case be harder for the driver to achieve the desired rocking function, and the several attempts therefore required to achieve backward rolling will result in less harmonic rocking.

Figure 2:
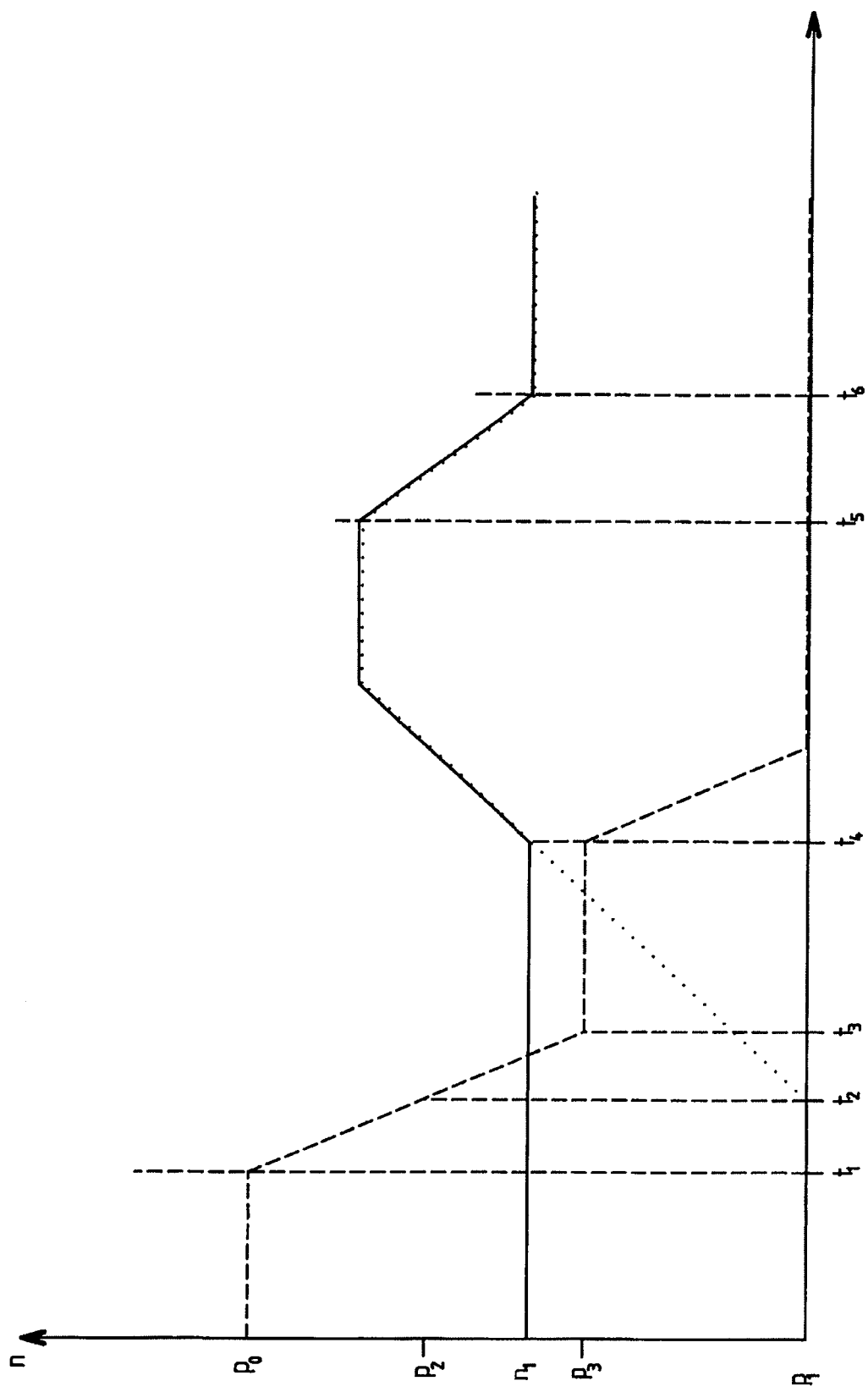
FIG. 2 illustrates a clutch function according to the state of the art.

The present invention solves this by changing the way in which the clutch is controlled during rocking as compared with the way in which it is controlled during normal driving of the vehicle. FIG. 2 schematically illustrates a normal clutch function for an automatically controlled clutch.

In FIG. 2, a continuous line represents the engine speed, a dotted line the rotation speed of the gearbox input shaft and a broken line the position of the clutch. The y axis denotes rotation speed for the continuous and dotted lines, and also the amount of clutch disc travel. When moving off normally from stationary, the engine will be at idling speed $n_1$, and the clutch will be in its fully open position $p_0$. Position $p_0$ represents a fully open clutch, position $p_1$ a fully closed clutch and position $p_2$ the contact point of the clutch, i.e. the stage at which the clutch disc begins to come into contact with the engine output shaft in order thereby to begin to transmit torque (driving force) via the clutch.

At time $t=t_1$, setting the vehicle in motion is initiated by the clutch beginning to close. When the clutch disc reaches position $p_2$ at $t=t_2$, the gearbox input shaft starts to rotate. The clutch thereafter closes to a position $p_3$ at which it is closed to such an extent as to be able to transmit the maximum torque that the engine is able to deliver at idling speed $n_1$. This clutch position, which is reached at $t=t_3$, is therefore maintained up to time $t=t_4$, which is when the gearbox input shaft reaches the engine's idling speed $n_1$ and there is therefore no longer any slippage across the clutch. At time $t=t_4$, the engine speed therefore begins to increase while at the same time the clutch closes completely and the vehicle is accelerated to an engine speed which is equivalent to a driving force demanded by the driver (e.g. by using the accelerator pedal).

If thereafter, at $t=t_5$, the driver releases the accelerator pedal, the vehicle will be engine-braked, with clutch closed, down to the idling speed $n_1$, see $t=t_6$. Once the engine speed has reached the idling speed $n_1$, this will be maintained, with clutch closed, until otherwise demanded by the driver (heavy vehicles are normally capable of delivering such a high torque at idling speed that the latter can be maintained even on at least a certain amount of upgrade). Instead of the clutch remaining closed at $t=t_6$, it may alternatively open. The clutch remaining closed does however have the advantage that the engine will continue to provide motive power, which may be preferable, e.g. when the vehicle is in a queue, so that it will move forward without the driver having to keep his/her foot on the accelerator pedal.

In contrast, according to the present invention, the way in which the clutch is controlled is changed when, for example, a rocking function arises.

Figure 3:
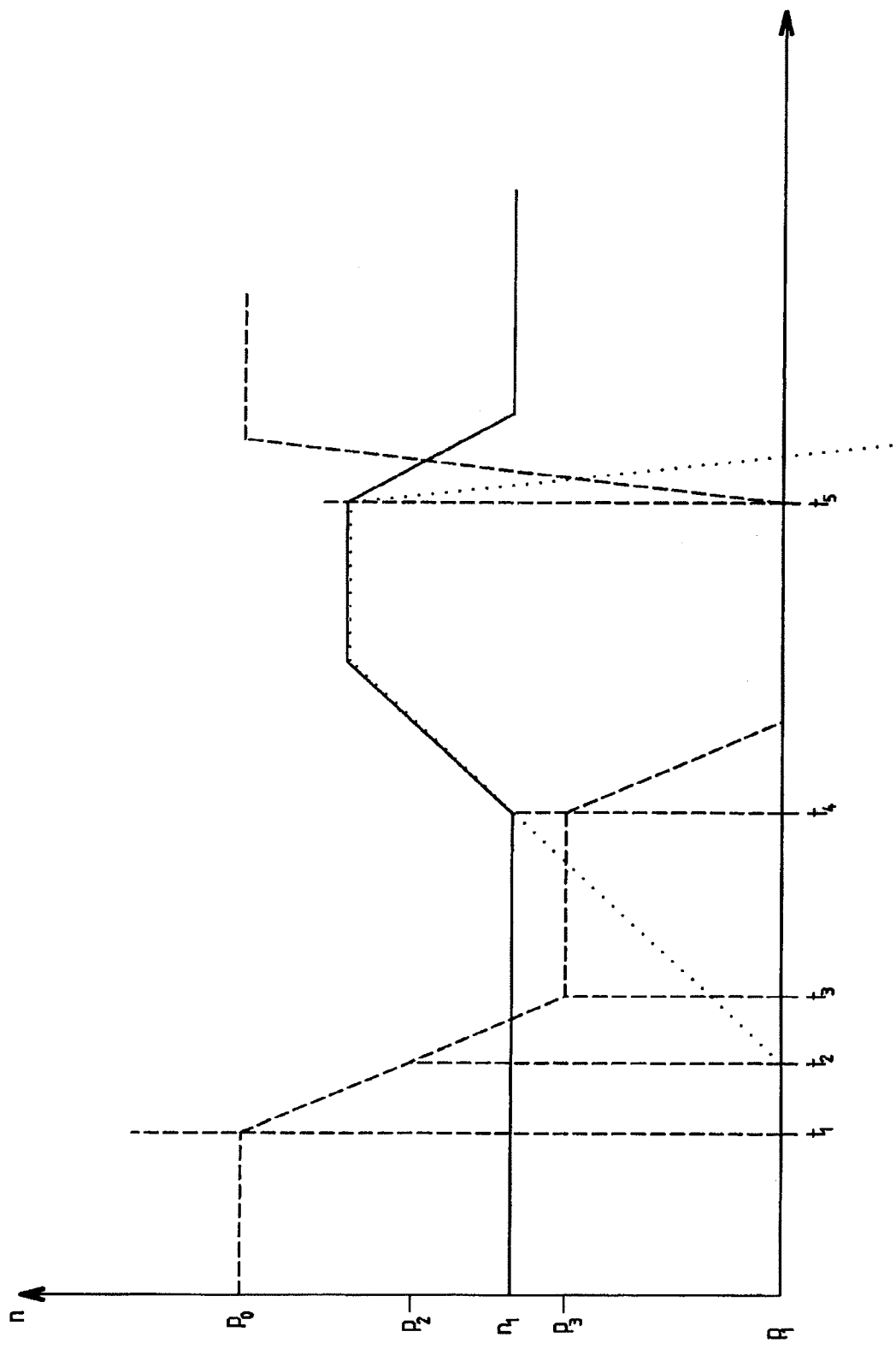
FIG. 3 illustrates an example of a clutch function according to the present invention.
Figure 4:
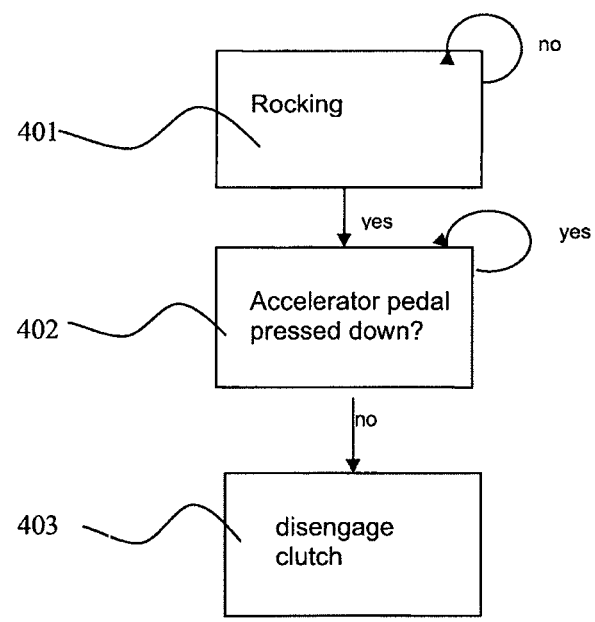
FIG. 4 illustrates an example of a method according to the present invention.

A method 400 according to the present invention is exemplified in FIG. 4 and the way the clutch behaves according to the present invention is illustrated in FIG. 3, in which the clutch functions precisely as in FIG. 2 up to time $t_5$. If a rocking situation occurs, step 401, and the driver depresses the accelerator pedal in an attempt to drive up out of a cavity/hollow and continues depressing it until the wheels begin to spin, he/she will then release the accelerator pedal, step 402. Instead of the engine speed being engine-braked down to idling speed as in FIG. 2, the clutch will open immediately according to the invention, step 403, when the driver releases the accelerator pedal. The clutch preferably opens as quickly as possible, immediately disconnecting the engine from the rest of the power train, which has the advantage that the engine's moment of inertia will not affect the change in direction of rotation of the powered wheels which occurs when the vehicle begins to roll back down into the cavity/hollow, so maximum benefit may also be derived from the backward roll. This is illustrated in the figure by the speed of the gearbox input shaft dropping rapidly and becoming negative when the vehicle begins to move in the opposite direction.

Once the vehicle has reached, and comes to a halt against, the opposite side of the cavity/hollow, the driver depresses the accelerator pedal again, whereupon the clutch closes and torque is applied to the powered wheels as above. In this way, according to the present invention, the driver can, despite the lack of a clutch pedal, rock the vehicle by using the accelerator pedal in precisely the same way as was previously possible by means of the clutch pedal.

Instead of using the accelerator pedal to rock the vehicle, other types of throttle control can be used, e.g. a hand-operated knob or lever mounted on the dashboard.

The present invention is therefore used in a situation in which there is a need for rocking. Assessing whether there is a need for rocking may be done in various ways. It may, for example, be determined automatically by the control system detecting that the vehicle's powered wheels are rotating but its unpowered wheels are not.

This assessment may for example be made by means of a sensor 120 on the gearbox output shaft (see FIG. 1), in which case the signal provided by the sensor 120 will represent the rotation speed of the output shaft. Alternatively, one or more wheel speed sensors 122-125 may be used (e.g. all of the vehicle's wheel speed sensors may be involved to ensure that the assessment is as correct as possible).

In this situation, the control system may be adapted to activate the rocking function and, preferably, make the driver of it, e.g. by activating a warning lamp or delivering an audible signal or in some other appropriate way. The driver will then know how the vehicle will behave when the accelerator pedal is released. The vehicle's control system may further be adapted to detect when there is no longer a need for rocking, e.g. by finding that the vehicle's unpowered wheels are rotating at substantially the same speed as its powered wheels, or that the unpowered wheels have reached a certain predetermined speed. Once such is the case, the clutch function may be adapted to return automatically to "normal operation".

Instead of the control system automatically detecting a need for rocking, the rocking mode may be adapted to be activated by the driver, e.g. by pressing a button or by appropriate input, e.g. via an MMI interface. Automatic detection of the need has the advantage, however, that rocking mode need not be activated manually, since this detection will take place automatically, enabling rocking as necessary, while at the same time the vehicle will behave precisely as usual once there is a normal driving situation.

Automatic detection of a need for rocking can also be done in other ways than by comparing the rotation speed of unpowered and powered wheels. For example, the increase in rotation speed of the powered wheels over time can be determined (by means of the sensor 120 and/or the sensors 120 and/or 121), and if this increase in speed suddenly rises markedly it may be assumed that the powered wheels have lost contact with the running surface and that there is accordingly a need for rocking. Alternatively, a rocking situation may be considered to exist if a rotation speed for said powered wheels has reached from stationary within a certain time an initial speed which could not otherwise have been achieved in such a short time.

Instead of the accelerator pedal having to be fully released for the clutch to open according to the present invention, in one embodiment the clutch will open immediately as soon as the driver eases back on the accelerator pedal, with consequent reduction in the driving force demanded.

According to a further alternative embodiment, it is sufficient to release the accelerator pedal far enough for it to be, for example, within a certain part of its range of movement, e.g. the tenth, fifth, third or quarter of the range of movement, which is nearest to the extreme position at which no driving force is demanded by the driver.

Furthermore, in one embodiment the clutch will open as quickly as possible in order thereby to reduce as quickly as possible the influence of the engine's moment of inertia upon the backward rolling. The clutch may however be adapted to opening at a lower vehicle speed than the maximum that can be achieved by the control system, though the clutch will still need to open "quickly".

The invention claimed is:

1. A method for controlling an automatically controlled clutch when setting a vehicle in motion on a running surface, wherein the vehicle comprises a combustion engine for generating driving force for transmission to at least one powered wheel, and a throttle control for demanding driving force from the engine responsive to driver actuation of the throttle control, the method comprising:
   controlling a magnitude of the driving force demanded from the engine responsive to operation of the throttle control;
   determining, when setting the vehicle in motion on the running surface from a stationary position or during a vehicle rocking condition, that a first criterion is fulfilled, the first criterion representing a grip of the at least one powered wheel on the running surface;
   determining that the throttle control is being released; and
   releasing the automatically controlled clutch when both of the following conditions are met: the determination is made that the first criterion is fulfilled and the determination is made that the throttle control is being released.

2. A method according to claim 1, wherein the first criterion comprises a determination of whether the at least one powered wheel has lost its grip on the running surface.

3. A method according to claim 1, wherein the first criterion comprises a determination of whether a rotation speed for the powered wheel has reached an initial speed.

4. A method according to claim 1, wherein the first criterion comprises a determination of whether a rotation speed difference between the powered wheel and at least one unpowered wheel of the vehicle fulfills a second criterion.

5. A method according to claim 1, wherein the representation of the grip on the running surface comprises a determination of a change in rotation speed over time for the powered wheel.

6. A method according to claim 1, wherein the throttle control is operated between a first extreme position and a second extreme position, wherein the demand for driving force is determined by the position of the throttle control.

7. A method according to claim 6, wherein operating the throttle control is via an accelerator pedal in the vehicle;

the method further comprising opening the clutch when movement of the accelerator pedal towards the first extreme position has reached a point where the throttle control is less than or equal to an initial distance from the first extreme position.

8. A method according to claim 1, wherein the throttle control comprises an accelerator pedal.

9. A method according to claim 1, wherein the method comprises rocking of the vehicle by the releasing of the automatically controlled clutch when the both of the conditions are met.

10. A method according to claim 1, wherein the first criterion represents a loss of the grip so as to prevent continuous forward movement of the vehicle.

11. A non-transitory computer-readable medium incorporating a program of instructions that when executed by a computer causes the computer to carry out a method for controlling an automatically controlled clutch when setting a vehicle in motion on a running surface, wherein the vehicle comprises a combustion engine for generating driving force for transmission to at least one powered wheel, and a throttle control for demanding driving force from the engine responsive to driver actuation of the throttle control, the method comprising:

controlling a magnitude of the driving force demanded from the engine responsive to operation of the throttle control;

determining, when setting the vehicle in motion on the running surface from a stationary position or during a vehicle rocking condition, that a first criterion is fulfilled, the first criterion representing a grip of the at least one powered wheel on the running surface;

determining that the throttle control is being released; and releasing the automatically controlled clutch when both of the following conditions are met: the determination is made that the first criterion is fulfilled and the determination is made that the throttle control is being released.

12. A non-transitory computer-readable medium according to claim 11, wherein the computer program is contained in the computer-readable medium.

13. A system for controlling an automatically controlled clutch when setting a vehicle in motion on a running surface, wherein the vehicle has a combustion engine for generating driving force for transmission to the at least one powered wheel, and a throttle control for demanding driving force from the engine, wherein the magnitude of the driving force demanded from the engine is controlled responsive to driver actuation of the throttle control, the system comprising:

a control unit configured to determine, when setting the vehicle in motion on the running surface from a stationary position or during a vehicle rocking condition, that a first criterion is fulfilled, the first criterion representing a grip of the at least one powered wheel on the running surface, and to determine that the throttle control is being released; and a clutch opener positioned and configured to open the automatically controlled clutch, when both of the following conditions are met:

the determination is made that the first criterion is fulfilled, and the determination is made that the throttle control is being released.

14. A system according to claim 13, wherein the throttle control operates between a first extreme position and a second extreme position, wherein the demand for driving force is determined by the position of the throttle control.

15. A vehicle that comprises a system according to claim 13.

* * * * *